(12) United States Patent
Shirota et al.

(10) Patent No.: US 8,837,676 B2
(45) Date of Patent: Sep. 16, 2014

(54) VIRTUAL-SLIDE CREATING DEVICE

(75) Inventors: Tetsuya Shirota, Tokyo (JP); Takashi Yoneyama, Kanagawa (JP); Chika Nakajima, Tokyo (JP); Yasuaki Natori, Tokyo (JP)

(73) Assignee: Olympus Corporation, Tokyo (JP)

( * ) Notice: Subject to any disclaimer, the term of this patent is extended or adjusted under 35 U.S.C. 154(b) by 243 days.

(21) Appl. No.: 13/042,178

(22) Filed: Mar. 7, 2011

(65) Prior Publication Data

US 2011/0221881 A1      Sep. 15, 2011

(30) Foreign Application Priority Data

Mar. 10, 2010  (JP) ................... 2010-053119

(51) Int. Cl.
  *H04N 7/18*       (2006.01)
  *G02B 21/36*      (2006.01)
  *G02B 21/26*      (2006.01)

(52) U.S. Cl.
  CPC .............. *G02B 21/367* (2013.01); *G02B 21/26* (2013.01)
  USPC .......................................................... 378/79

(58) Field of Classification Search
  CPC ....................................................... G02B 21/26
  USPC ........ 348/61–95; 382/133; 250/208; 356/237
  See application file for complete search history.

(56) References Cited

U.S. PATENT DOCUMENTS

| | | | |
|---|---|---|---|
| 7,417,213 B2 * | 8/2008 | Krief et al. | 250/208.1 |
| 7,456,947 B2 * | 11/2008 | Kurata | 356/237.2 |
| 7,949,161 B2 | 5/2011 | Kawanabe et al. | |
| 8,000,560 B2 * | 8/2011 | Shirota | 382/284 |
| 8,253,788 B2 * | 8/2012 | Maddison et al. | 348/79 |
| 2007/0081231 A1 | 4/2007 | Shirota et al. | |
| 2008/0187208 A1 * | 8/2008 | Shirota | 382/133 |
| 2008/0285795 A1 * | 11/2008 | Maddison et al. | 382/100 |

FOREIGN PATENT DOCUMENTS

| | | |
|---|---|---|
| JP | H09-281405 | 10/1997 |
| JP | H11-295610 | 10/1999 |
| JP | 2002-226861 | 8/2002 |
| JP | 2003207720 | 7/2003 |
| JP | 2006284965 | 10/2006 |
| JP | 2007017930 A | 1/2007 |
| JP | 2008-191427 | 8/2008 |

* cited by examiner

*Primary Examiner* — William C Vaughn, Jr.
*Assistant Examiner* — Naod Belai (57) ABSTRACT

It is possible to create a virtual slide of a subject of observation in a simple configuration without setting a movement pattern in advance. Provided is a virtual-slide creating device including a stage on which a sample is mounted; an objective lens that collects light from the sample; a relative movement mechanism that moves at least one of these components relative to each other in a direction crossing the optical axis of the objective lens; a position detecting unit that obtains relative position information of the stage and the objective lens; an image capturing unit that acquires a partial enlarged image of the sample; a display unit that displays the enlarged image acquired; an image saving unit that saves an enlarged image acquired by the image capturing unit each time at least one of the stage and the objective lens is moved relative to each other by a predetermined distance, based on the relative position information obtained; and an image processing unit that creates a virtual slide by forming an array of saved enlarged images based on the relative position information detected.

4 Claims, 9 Drawing Sheets

VIRTUAL-SLIDE CREATING DEVICE

CROSS-REFERENCE TO RELATED APPLICATIONS

This application is based upon and claims the benefit of priority from Japanese Patent Application No. 2010-053119, filed on Mar. 10, 2010, the entire contents of which are incorporated herein by reference.

BACKGROUND OF THE INVENTION

1. Field of the Invention

The present invention relates to virtual-slide creating devices.

2. Description of the Related Art

Conventionally, in medical fields, such as disease diagnosis, it is necessary during diagnosis to grasp the entire image of a subject of observation, such as tissue or cell, as well as to grasp the microstructure of a limited small part thereof. Virtual slides are known as a method for efficiently observing an entire image and a microscopic observation image (e.g., see Patent Literature 1).

A virtual slide makes it possible to observe a virtual slide image that looks as if an image of an entire subject of observation were captured at once, by repeatedly capturing partial microscopic images of the subject at a high magnification factor while shifting the image capturing area such that adjacent images partially overlap each other, and processing the acquired multiple microscopic images and joining them together without displacements.

In a virtual-slide creating method disclosed in Patent Literature 1, positions for capturing enlarged images are set in advance such that images will be captured fully covering an entire subject of observation, and a microscope controller acquires enlarged images according to a movement pattern set in advance.

CITATION LIST

Patent Literature

{PTL 1} Japanese Unexamined Patent Application, Publication No. 2007-17930

SUMMARY OF THE INVENTION

A first aspect of the present invention is a virtual-slide creating device including a stage on which a sample is mounted; an objective lens that collects light from the sample mounted on the stage; a relative movement mechanism that moves at least one of the stage and the objective lens relative to each other in a direction crossing the optical axis of the objective lens; a position detecting unit that obtains relative position information of the stage and the objective lens; an image capturing unit that captures the light collected by the objective lens to acquire a partial enlarged image of the sample; a display unit that displays the enlarged image acquired by the image capturing unit; an image saving unit that saves an enlarged image acquired by the image capturing unit each time at least one of the stage and the objective lens is moved relative to each other by a predetermined distance, based on the relative position information obtained by the position detecting unit; and an image processing unit that creates a virtual slide by forming an array of enlarged images saved by the image saving unit, based on the relative position information detected by the position detecting unit.

A second aspect of the present invention is a virtual-slide creating device including a stage on which a sample is mounted; an objective lens that collects light from the sample mounted on the stage; a relative movement mechanism that moves at least one of the stage and the objective lens relative to each other in a direction crossing the optical axis of the objective lens; an operation input unit that outputs a movement instruction signal to the relative movement mechanism; a position detecting unit that obtains relative position information of the stage and the objective lens; an image capturing unit that captures the light collected by the objective lens to acquire a partial enlarged image of the sample; a display unit that displays the enlarged image acquired by the image capturing unit; an image saving unit that saves an enlarged image acquired by the image capturing unit each time at least one of the stage and the objective lens is moved relative to each other by a predetermined distance, based on the relative position information obtained by the position detecting unit; and an image processing unit that creates a virtual slide by forming an array of enlarged images saved by the image saving unit, based on the relative position information detected by the position detecting unit.

BRIEF DESCRIPTION OF THE DRAWINGS

FIG. 9 is a block diagram showing another modification of

DETAILED DESCRIPTION OF THE PREFERRED EMBODIMENTS

A virtual-slide creating device 1 according to an embodiment of the present invention will be described below with reference to the drawings.

Figure 1:
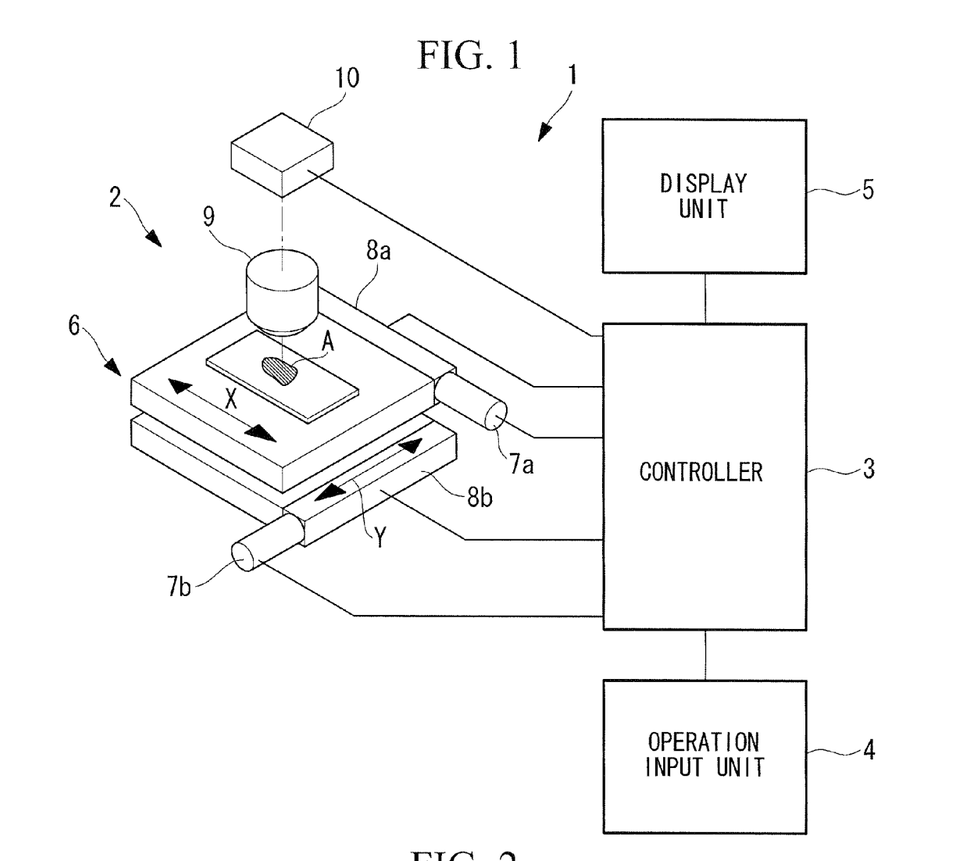
FIG. 1 is an overall configuration diagram schematically showing a virtual-slide creating device according to an embodiment of the present invention.

As shown in FIG. 1, a virtual-slide creating device 1 according to this embodiment includes a microscope main unit 2, a controller 3 that controls the microscope main unit 2 and that creates a virtual slide, an operation input unit 4 for inputting operation instruction signals for the microscope main unit 2 to the controller 3, and a display unit (e.g., a display) that displays an image captured by the microscope main unit 2 and that also displays the virtual slide created by the controller 3.

As shown in FIG. 1, the microscope main unit 2 includes a stage 6 for mounting a sample A placed on a slide glass, motors (relative movement mechanism) 7a and 7b that move the stage 6 in two horizontal directions perpendicular to each other (directions perpendicular to the optical axis of an objective lens 9, which will be described later, i.e., the directions of arrows X and Y, which are perpendicular to the optical axis of the objective lens 9), sensors (position detecting unit) 8a and 8b that detect the position of the stage 6 moved by the motors 7a and 7b relative to an origin (relative position information), an objective lens 9 that faces the sample A and that collects light from the sample A, and an image capturing unit 10, such as a CCD, that captures the light collected by the objective lens 9 to acquire an enlarged image of the sample A.

The stage 6 is configured so that it can be moved in the direction of the arrow X by the motor 7a and in the direction of the arrow Y by the motor 7b.

The sensors 8a and 8b are configured to detect the position of the stage 6 along the X direction and along the Y direction, respectively, and to individually send position information representing the results to the controller 3.

The image capturing unit 10 is configured to capture an image of the sample A placed on the slide glass and to send the resulting image data to the controller 3.

The operation input unit 4 may be any type of input device (interface), such as a joystick or a jog dial. The operation input unit 4 is configured to output movement instruction signals to the motors 7a and 7b so that the stage 6 will be moved in the X and Y directions, respectively.

The controller 3 is configured to process the image data transferred from the image capturing unit 10 of the microscope main unit 2 and to display the resulting image on the display unit 5. Furthermore, the controller 3 is configured to send movement instruction signals input from the operation input unit 4 to the individual motors 7a and 7b so that the stage 6 will be moved horizontally by distances corresponding to the movement instruction signals.

Figure 2:
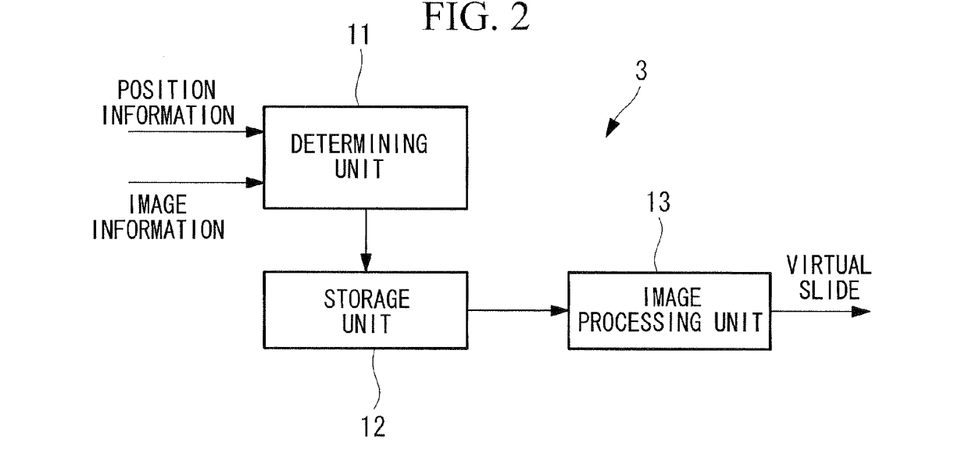
FIG. 2 is a block diagram showing a controller of the virtual-slide creating device shown in FIG. 1.

Furthermore, as shown in FIG. 2, the controller 3 includes a determining unit (e.g., a central processing unit (CPU)) 11. The determining unit 11 calculates the distance moved by the stage 6 from the immediately preceding image acquisition position based on the position information of the stage 6 transferred from the sensors 8a and 8b. Furthermore, the determining unit 11 determines whether the calculated movement distance exceeds a predetermined threshold. In this embodiment, the determining unit 11 is configured to calculate the distances moved by the stage 6 in the X and Y directions individually. Furthermore, thresholds are individually set for the X and Y directions.

Furthermore, as shown in FIG. 2, the controller 3 includes a storage unit (image saving unit) 12 (e.g., an image data server). When the calculated movement distance exceeds the predetermined threshold, the storage unit 12 stores an enlarged image transferred at that time from the image capturing unit 10, in association with the position information of the stage 6 transferred at that time from the sensors 8a and 8b. The controller 3 also includes an image processing unit 13 (e.g., a CPU) that forms an array of images stored in the storage unit 12 to create a virtual slide. That is, the controller 3 is configured to store an enlarged image in the storage unit 12 in association with the position information of the stage 6 when the movement distance in the X direction exceeds the threshold for the X direction or the movement distance in the Y direction exceeds the threshold for the Y direction. Alternatively, data of the enlarged image and data of the position information of the stage 6 may be stored in separate storage units.

Accordingly, even if the stage 6 is moved simultaneously in the X direction and in the Y direction and the movement distance exceeds a predetermined distance, an enlarged image G is not saved unless the stage 6 is moved by the predetermined distance either in the X direction or in the Y direction. This serves to maintain a uniform overlapping width between adjacent images that are saved. Thus, it is possible to readily execute processing for joining images together, in which displacements caused in image pattern recognition using images having overlapping portions are suppressed.

The image processing unit 13 is configured to form an array of enlarged images corresponding to portions of the sample A, stored in the storage unit 12, thereby creating a virtual slide in which the enlarged images are joined together. Specifically, since each enlarged image corresponding to a portion of the sample A is stored in association with the position information of the stage 6 at the time of acquisition of the enlarged image, it is possible to create a virtual slide simply by joining together the enlarged images to form an array according to the position information of the stage 6.

Figure 3:
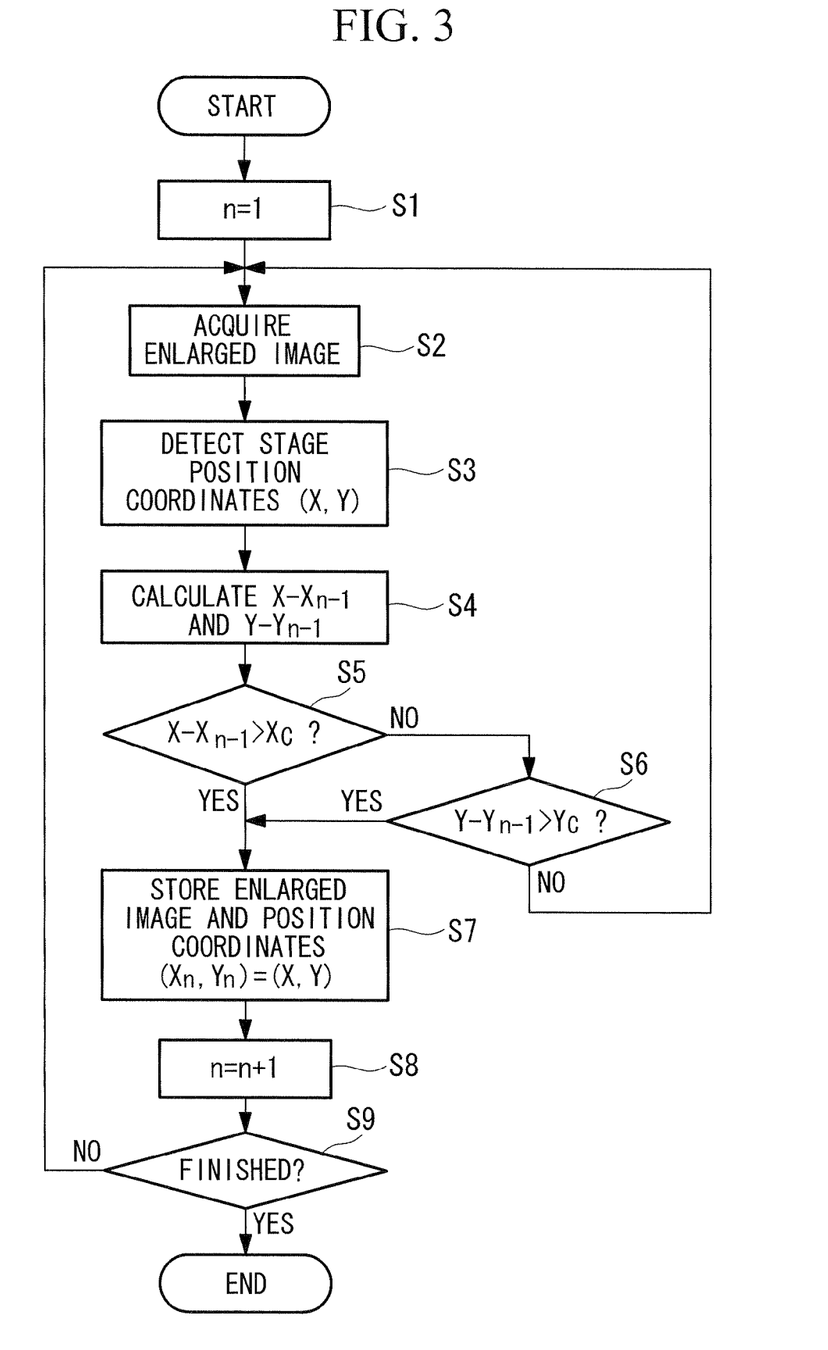
FIG. 3 is flowchart showing an operation for acquiring an enlarged image using the virtual-slide creating device shown in FIG. 1.

The operation of the thus-configured virtual-slide creating device 1 according to this embodiment will be described with reference to FIGS. 3 and 4.

In order to create a virtual slide of the sample A using the virtual-slide creating device 1 according to this embodiment, first, initial setting is performed (step S1), and then the image capturing unit 10 of the microscope main unit 2 is operated to capture an image of the sample A on the stage 6 (step S2). In the initial setting, the argument is set to 1, and the stage 6 is placed at the origin $(X_0, Y_0)$.

The image acquired by the image capturing unit 10 is constantly fed to and processed by the controller 3, and the resulting image is displayed on the display unit 5. Making reference to the image on the display unit 5, an observer operates the operation input unit 4 to move the stage 6 of the microscope main unit 2 horizontally in the X and Y directions, thereby moving an image capturing area of the sample A captured by the image capturing unit 10. The observer can move the stage 6 so that the entire sample A is displayed without missing any part by looking for the sample A appearing in the image displayed on the display unit 5.

When the stage 6 has been moved, the sensors 8a and 8b obtain the position of the stage 6, for example, the position coordinates (X, Y) at the center of the stage 6, and send the position coordinates (X, Y) to the controller 3 (step S3). The determining unit 11 of the controller 3 calculates the movement distance between the position coordinates (X, Y) of the stage 6 and the position coordinates $(X_0, Y_0)$ of the origin (step S4). Specifically, the determining unit 11 calculates the difference $(X-X_0, Y-Y_0)$ between the position coordinates $(X, Y)$ of the stage 6 and the position coordinates $(X_0, Y_0)$ of the origin.

The determining unit 11 compares the calculated difference $(X-X_0, Y-Y_0)$ representing the movement distance with the predetermined thresholds $(X_c, Y_c)$ to determine whether the X component $X-X_0$ and the Y component $Y-Y_0$ of the difference are greater than the thresholds $X_c$ and $Y_c$, respectively (steps S5 and S6). Then, when either $X-X_0 > X_c$ or $Y-Y_0 > Y_c$ is satisfied, the controller 3 stores an enlarged image acquired at that instance in the storage unit 12 in association with the position information $(X_1, Y_1)$ of the stage 6 at that instance (step S7).

Then, the argument n is incremented (step S8), and it is determined whether image acquisition has been entirely completed (step S9). If image acquisition has not been entirely completed, steps S2 to S9 are repeated.

In the case where image acquisition has not been entirely completed, if the observer continuously operates the operation input unit 4 to move the stage 6, the position coordinates $(X, Y)$ of the stage 6 detected by the sensors 8a and 8b are sent to the controller 3, and the determining unit 11 of the controller 3 calculates the movement distance $(X-X_{n-1}, Y-Y_{n-1})$ between the position coordinates $(X, Y)$ of the stage 6 and the position coordinates $(X_{n-1}, Y_{n-1})$ of the stage 6 associated with an immediately preceding enlarged image that has been stored (step S4).

The determining unit 11 compares the calculated difference $(X-X_{n-1}, Y-Y_{n-1})$ representing the movement distance with the predetermined thresholds $(X_c, Y_c)$ to determine whether the X component $X-X_{n-1}$ and the Y component $Y-Y_{n-1}$ of the difference are greater than the thresholds $X_c$ and $Y_c$, respectively (steps S5 and S6). Then, when either $X-X_{n-1} > X_c$ or $Y-Y_{n-1} > Y_c$ is satisfied, the determining unit 11 stores an enlarged image acquired at that instance in the storage unit 12 in association with the position information $(X_n, Y_n)$ of the stage 6 at that instance.

Accordingly, the enlarged images G stored in the storage unit 12 have a uniform overlapping width in the X direction or the Y direction with their adjacent enlarged images G. In the case of an example shown in FIG. 4A, the image capturing area is shifted from left to right along the direction of an arrow (mainly the X direction), so that enlarged images G are sequentially stored with a uniform overlapping width hx in the X direction, whereby the first row of enlarged images G is acquired. In the figure, broken lines represent previously acquired enlarged images, and a solid line represents the latest enlarged image G.

Figure 4A:
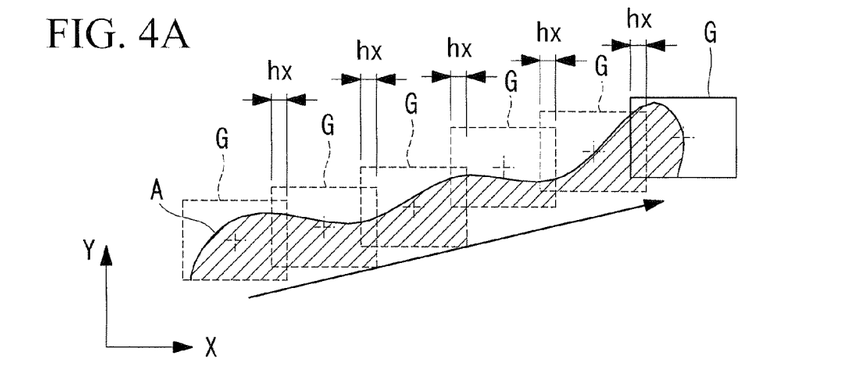
FIG. 4A is a diagram for explaining the operation for acquiring an enlarged image according to the flowchart shown in FIG. 3, in which the order of acquisition of the first row of enlarged images is shown.
Figure 4B:
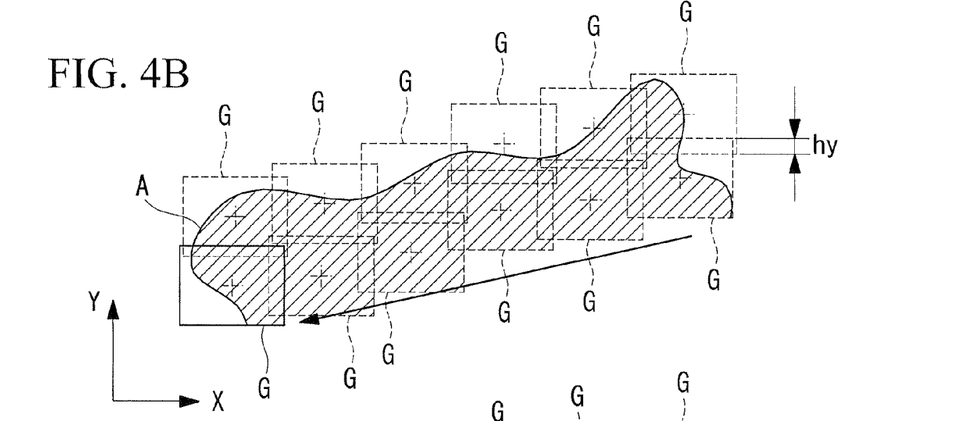
FIG. 4B is a diagram for explaining the operation for acquiring an enlarged image according to the flowchart shown in FIG. 3, in which the order of acquisition of the second row of enlarged images is shown.
Figure 4C:
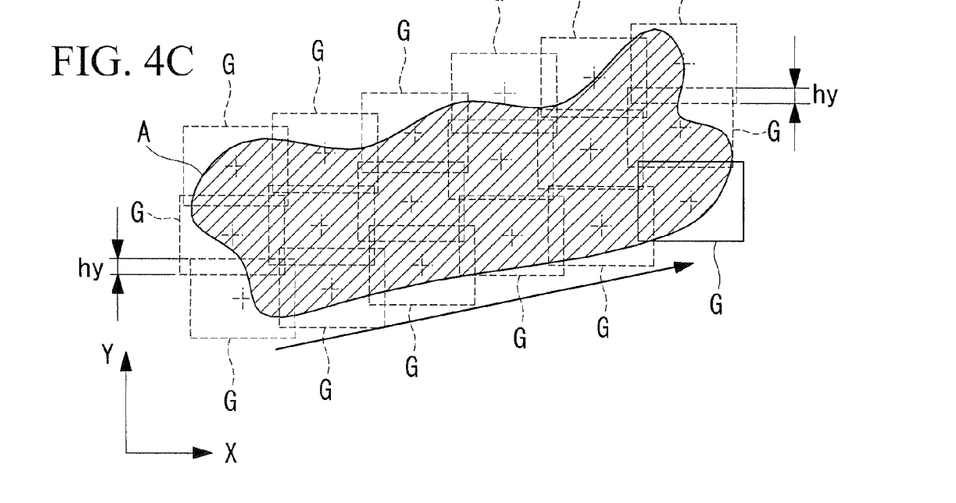
FIG. 4C is a diagram for explaining the operation for acquiring an enlarged image according to the flowchart shown in FIG. 3, in which the order of acquisition of the third row of enlarged images is shown.

Then, as shown in FIG. 4B, when acquiring a row of enlarged images G under the row of enlarged images G shown in FIG. 4A, an enlarged image G is acquired at the position with a predetermined overlapping width hy in the Y direction with the rightmost enlarged image G in the upper row of enlarged images G shown in FIG. 4A. Then, the image capturing area is shifted from right to left along the direction of an arrow (mainly the X direction), so that enlarged images G are sequentially stored with a uniform overlapping width hx in the X direction, whereby the second row of enlarged images G is acquired. As shown in FIG. 4C, the third row of enlarged images G is acquired in a similar way. In this way, enlarged images for the entire sample A are stored without missing any part.

The image processing unit 13 included in the controller 3 creates a virtual slide by joining together the enlarged images G stored in the storage unit 12 according to the position information stored in association with the enlarged images G.

With the virtual-slide creating device 1 according to this embodiment, a sample A is mounted on the stage 6, and an image of the sample A is captured by the image capturing unit 10. While displaying a partial enlarged image G of the sample A on the display unit 5, the operation input unit 4 is operated so that the relative movement mechanism 7a and 7b moves the objective lens 9 and the sample A relative to each other in directions crossing the optical axis of the objective lens 9. When the objective lens 9 and the stage 6 have been moved relative to each other, the position detecting units 8a and 8b detect relative position information. The image saving unit 12 monitors the amount of relative movement, and saves an enlarged image acquired by the image capturing unit 10 each time a relative movement of a predetermined distance occurs. The image processing unit 13 can simply create a virtual slide by forming an array of enlarged images G that have been saved based on the relative position information detected by the position detecting unit 8a and 8b at the time of acquisition of the enlarged images G.

That is, since the observer can move the objective lens 9 and the stage 6 relative to each other using the operation input unit 4 while viewing the display unit 5, the observer can save the pointless task of moving the objective lens 9 and the stage 6 relative to each other in regions where the sample A is absent. Furthermore, since an enlarged image G is automatically saved each time the objective lens 9 and the stage 6 are moved relative to each other by a predetermined distance, it is not necessary to set a movement pattern in advance. Thus, the workload needed for the setting a movement pattern and the time required for prescanning are saved.

As described above, with the virtual-slide creating device 1 according to this embodiment, it suffices for the observer to operate the operation input unit 4 while viewing the display unit 5, whereby enlarged images G are automatically stored without gaps therebetween. Thus, it is possible to readily acquire multiple enlarged images G covering the entire sample A without setting a movement pattern in advance. At that time, an advantage is afforded in that ineffective images not containing the sample A are not acquired. Furthermore, since the work of extracting the contour of the sample A for setting a movement pattern in advance is saved, the time required for creating a virtual slide can be reduced considerably.

In this embodiment, the image processing unit 13 creates a virtual slide after all the enlarged images are acquired. Alternatively, a virtual slide may be created by progressively joining together enlarged images G upon acquisition of each enlarged image G.

Furthermore, in this embodiment, the determining unit 11 calculates the distances moved by the stage 6 individually for the X direction and the Y direction, and an enlarged image G is stored in the storage unit 12 when either one of the distances exceeds the relevant threshold. Alternatively, the arrangement may be such that the determining unit 11 calculates a single movement distance and that an enlarged image G is stored when the movement distance exceeds a single threshold.

Furthermore, with the virtual-slide creating device 1 according to this embodiment, the following processing may be performed with an enlarged image G stored in the storage unit 12 in order to create a virtual slide, as shown in FIGS. 5 to 11.

Figure 5:
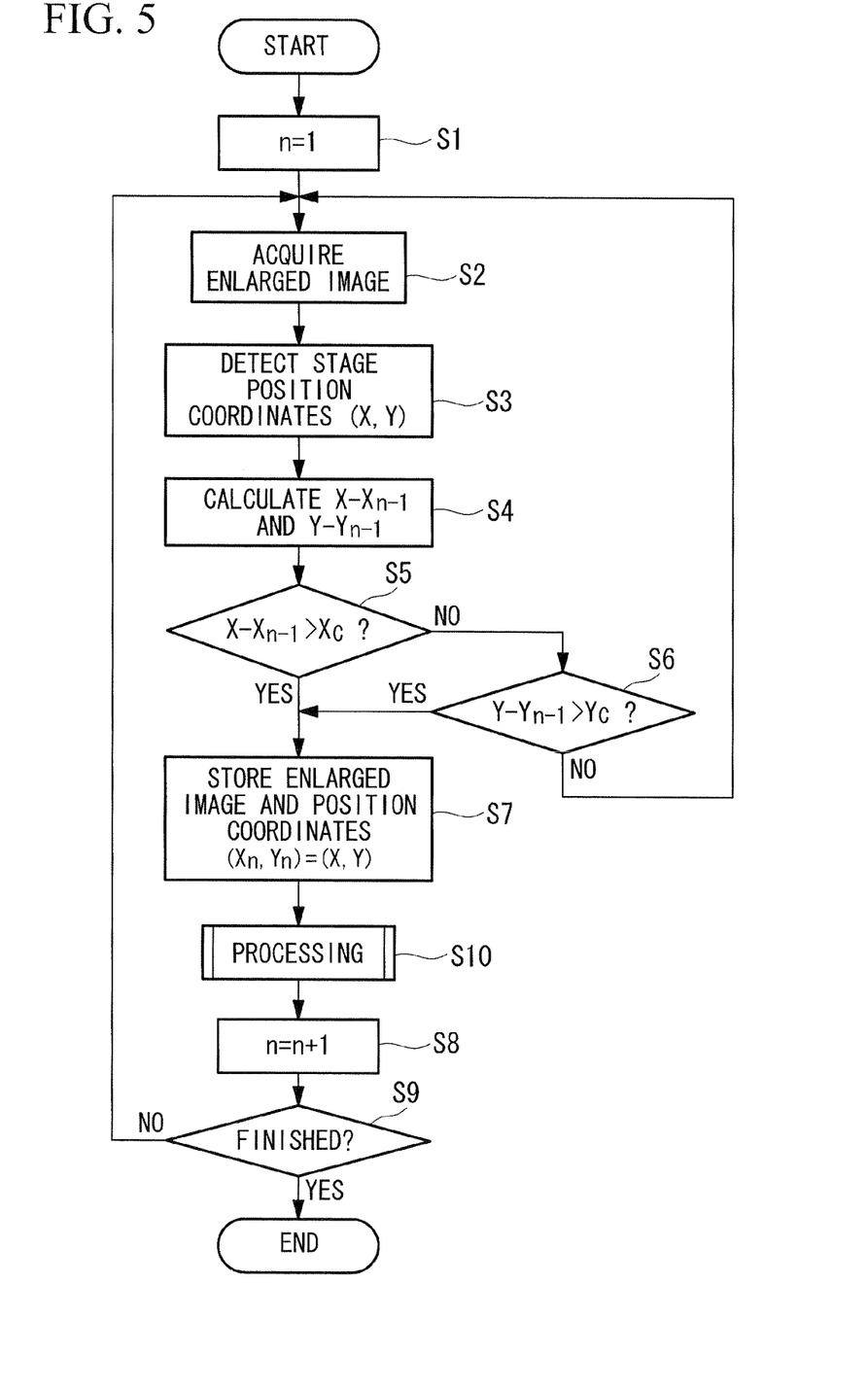
FIG. 5 is a flowchart showing a modification of the operation for acquiring an enlarged image using the virtual-slide creating device shown in FIG. 1.

As shown in FIG. 5, a processing subroutine S10 may be provided between step S7 of storing an enlarged image $G_n$ and its position coordinates $(X_n, Y_n)$ in the storage unit 12 and step S8 of incrementing the argument n.

Figure 6:
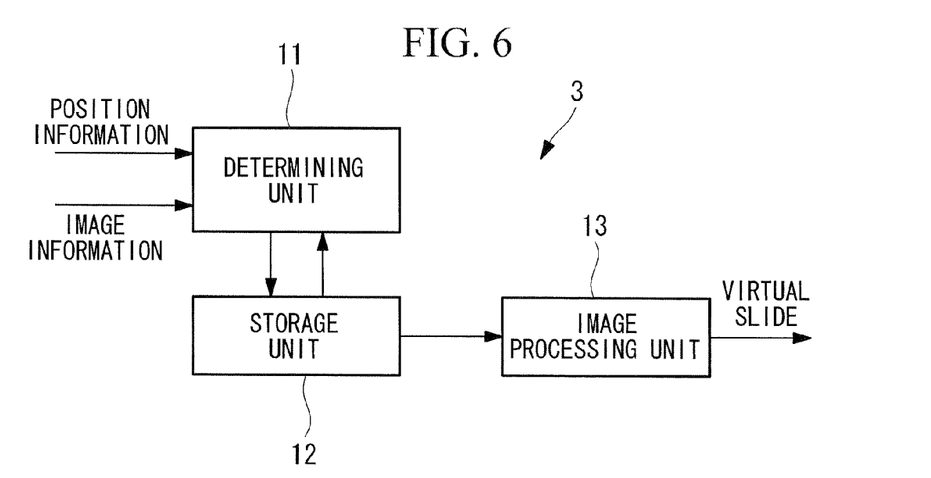
FIG. 6 is a block diagram showing a modification of the controller shown in FIG. 2.

In this case, the determining unit 11 of the controller 3 calculates the contrast of the newly acquired enlarged image $G_n$, and also retrieves an enlarged image G already stored in the storage unit 12 and calculates the contrast of the enlarged image G. Then, the determining unit 11 stores the enlarged image having a higher contrast in the storage unit 12. The determining unit 11 constitutes a contrast calculating unit and a contrast comparing unit.

Figure 7:
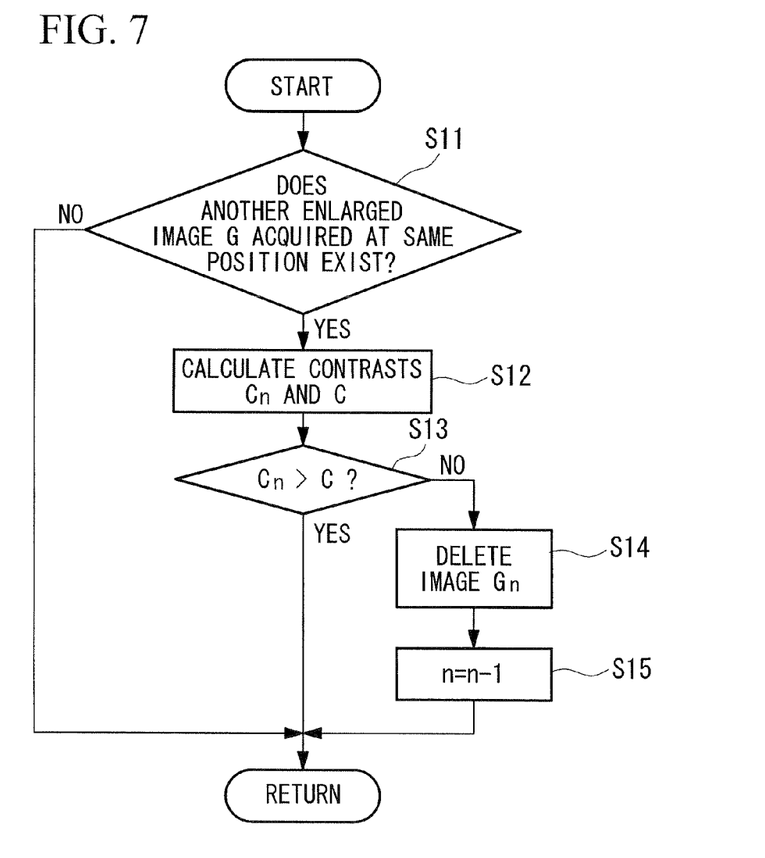
FIG. 7 is a flowchart showing an example of a subroutine in the flowchart shown in FIG. 5.

In the processing subroutine S10, for example, as shown in FIG. 7, first, the determining unit 11 determines whether there exists an enlarged image G previously acquired at the same position as the latest enlarged image $G_n$ stored most recently in the storage unit 12 (step S11). This is determined, for example, by performing a search to find whether another enlarged image G having center coordinates in the range of the latest enlarged image $G_n$ is stored in the storage unit 12. If no other enlarged image G exists, the procedure returns to step S8 where the argument n is incremented.

Figure 8:
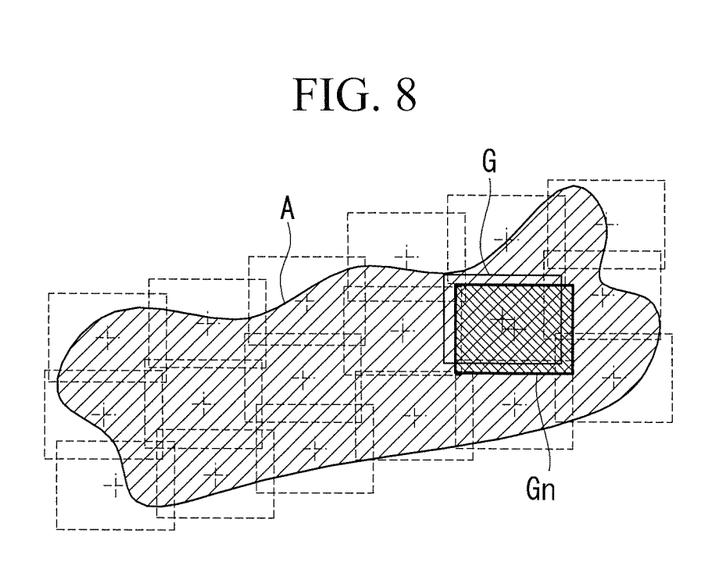
FIG. 8 is a diagram for explaining the operation for acquiring an enlarged image according to the flowchart shown in FIG. 7.

As shown in FIG. 8, if there exists another enlarged image G acquired at the same position as the latest enlarged image $G_n$, the determining unit 11 calculates the contrast $C_n$ of the enlarged image $G_n$ and the contrast C of the enlarged image G retrieved from the storage unit 12 (step S12).

Then, the determining unit 11 compares these contrasts $C_n$ and C (step S13). If the contrast $C_n$ of the latest enlarged image $G_n$ is greater than the contrast C of the previous enlarged image G, the procedure returns to step S8. On the other hand, if the contrast $C_n$ is less than or equal to the contrast C, the latest enlarged image $G_n$ is deleted (step S14), the argument n is decremented (step S15), and then the procedure returns to step S8.

When creating a virtual slide by forming an array of enlarged images G acquired in this way, the image processing unit 13 joins together the enlarged images G by overwriting them in the order in which they are captured. Thus, when there exist multiple enlarged images G acquired at the same position, an enlarged image G with a highest contrast remains. Thus, an advantage is afforded in that it is possible to create a sharp virtual slide having a high contrast.

Furthermore, in the case where it is possible to change the image-capturing magnification factor (observation magnification factor) by switching among multiple objective lenses 9 with an observation-magnification-factor changing unit (not shown), such as a revolver, the subroutine S10 may be executed in the following manner.

Figure 9:
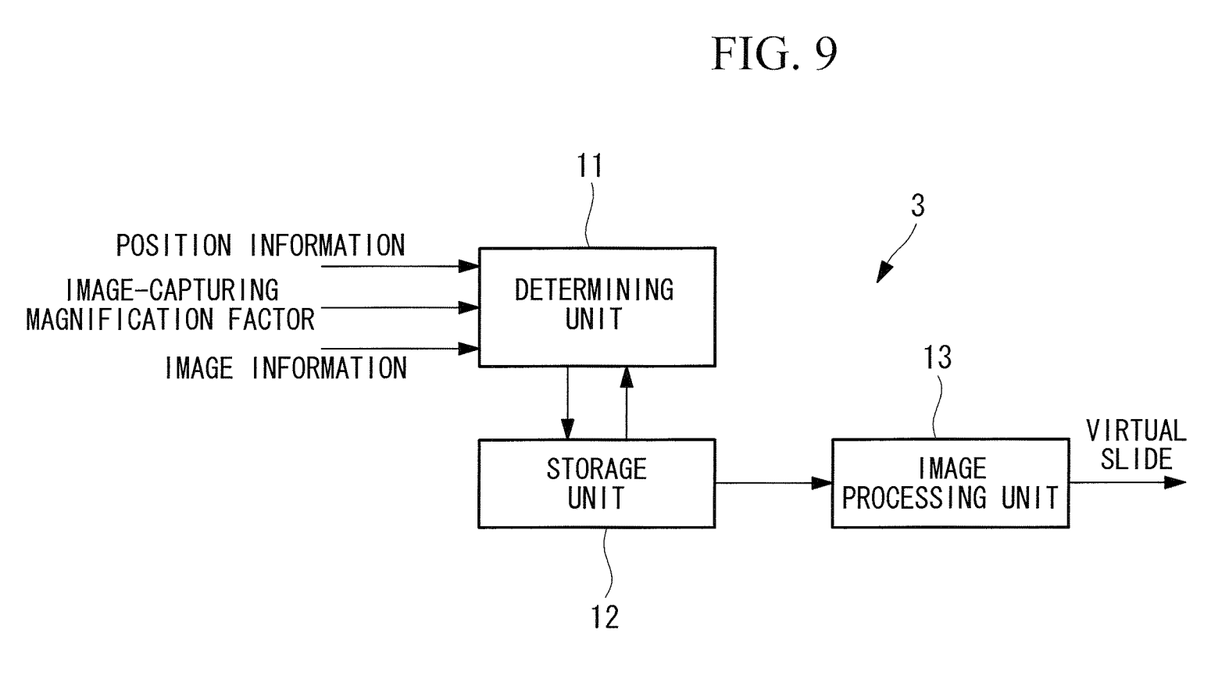

In this case, as shown in FIG. 9, information about the image-capturing magnification factor switched using the revolver is also input to the determining unit 11 of the controller 3.

Figure 10:
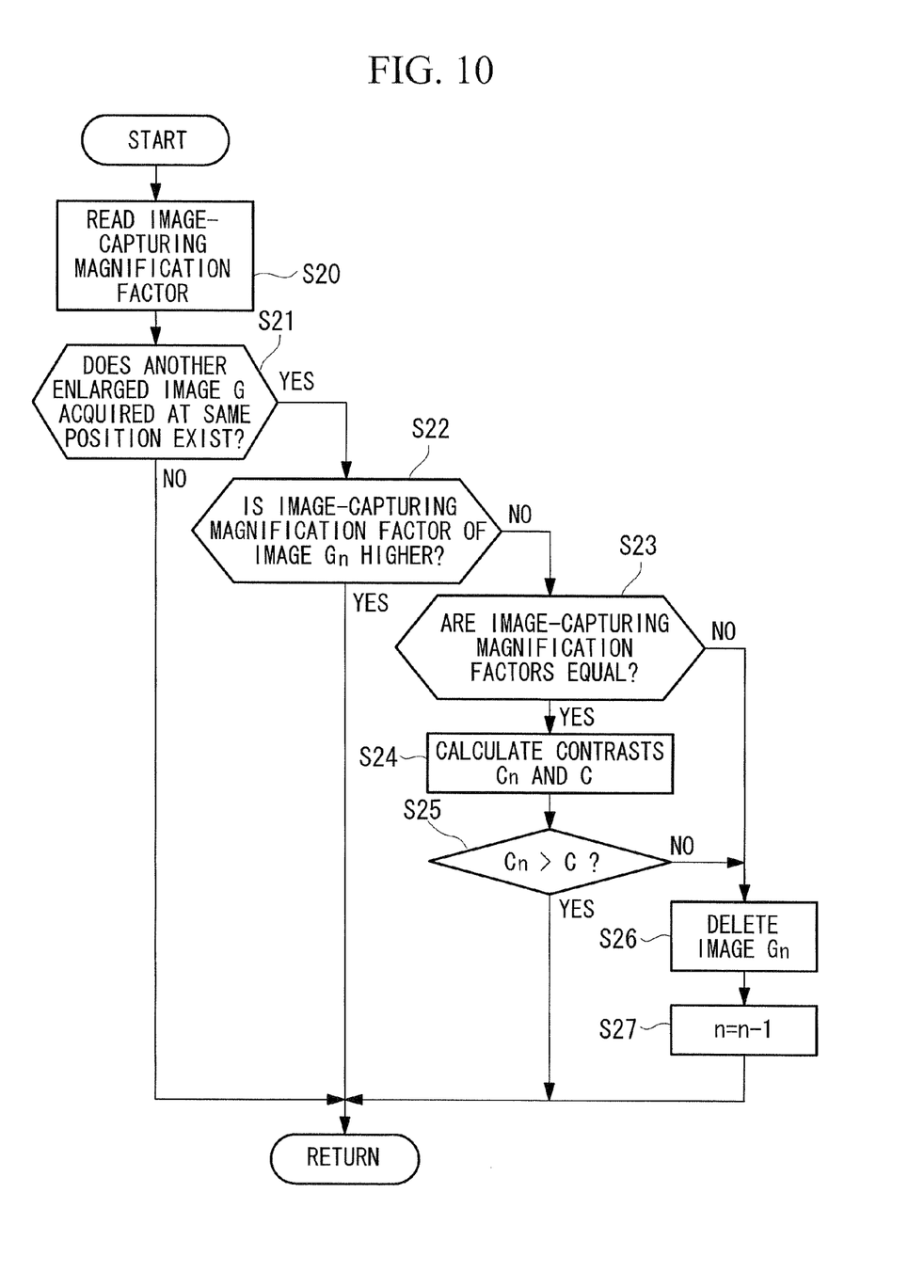
FIG. 10 is a flowchart showing another example of the subroutine in the flowchart shown in FIG. 5.

As shown in FIG. 10, first, when an enlarged image G is acquired and the subroutine S10 is started, the determining unit 11 reads the information about the image-capturing magnification factor (step S20). Then, it is determined whether there exists an enlarged image G previously acquired at the same position as an enlarged image $G_n$ most recently stored in the storage unit 12 (step S21). If there exists no other such enlarged image G, the procedure returns to step S8 where the argument n is incremented.

Figure 11:
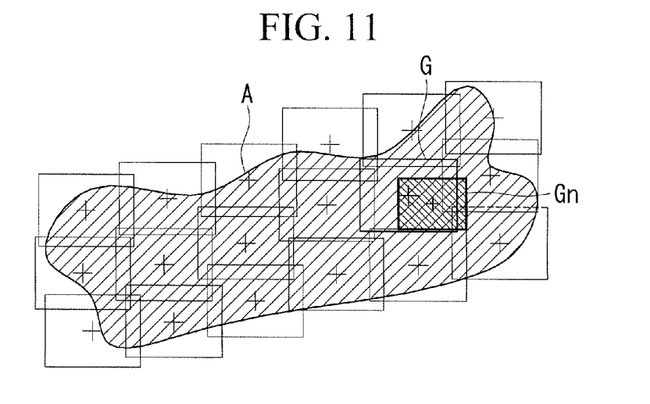
FIG. 11 is a diagram for explaining the operation for acquiring an enlarged image according to the flowchart shown in FIG. 10.

As shown in FIG. 11, if there exists another enlarged image G acquired at the same position as the latest enlarged image $G_n$, the determining unit 11 determines whether the image-capturing magnification factor of the latest enlarged image $G_n$ is greater than the image-capturing magnification factor of the other enlarged image G acquired at the same position (step S22). If the former is greater than the latter, the procedure returns to step S8 where the argument n is incremented. On the other hand, if the former is not greater than the latter, the determining unit 11 determines whether the image-capturing magnification factors are equal (step S23). If the image-capturing magnification factors are not equal, i.e., if the image-capturing magnification factor of the latest enlarged image $G_n$ is less than the image-capturing magnification factor of the other enlarged image G acquired at the same position, the latest enlarged image $G_n$ is deleted (step S26), the argument n is decremented (step S27), and then the procedure returns to step S8.

On the other hand, if the image-capturing magnification factor of the latest enlarged image $G_n$ is equal to the image-capturing magnification factor of the other enlarged image G acquired at the same position, the determining unit 11 calculates the contrast $C_n$ of the enlarged image $G_n$ and the contrast C of the other enlarged image G retrieved from the storage unit 12 (step S24). Then, the determining unit 11 compares these contrasts $C_n$ and C (step S25). If the contrast $C_n$ of the latest enlarged image $G_n$ is greater than the contrast C of the previously acquired enlarged image G, the procedure returns to step S8. On the other hand, if the contrast $C_n$ is less than or equal to the contrast C, the latest enlarged image $G_n$ is deleted (step S26), the argument n is decremented (step S27), and then the procedure returns to step S8.

When creating a virtual slide by forming an array of enlarged images G acquired in this way, the image processing unit 13 joins together the enlarged images G by overwriting them in the order in which they are captured. Thus, among multiple enlarged images G acquired at the same position, an enlarged image G with a highest image-capturing magnification factor or a highest contrast remains. Accordingly, an advantage is afforded in that it is possible to create a virtual slide in which the image-capturing magnification factor is high in important regions and in which the image is sharp with a high contrast as a whole.

Since the image capturing area becomes smaller as the image-capturing magnification factor is increased, the threshold for determining, with the determining unit 11, whether to store an enlarged image G in the storage unit 12 may be made smaller in accordance with the image-capturing magnification factor, whereas the threshold may be made greater when the image-capturing magnification factor is decreased.

Furthermore, although the objective lens 9 is fixed and the stage 6 having the sample A mounted thereon is moved in this embodiment, conversely, the arrangement may be such that the stage 6 is fixed and the objective lens 9 is moved.

Furthermore, the determining unit 11 may also function as a velocity detecting unit that calculates the velocity of the stage 6 (relative moving velocity) by differentiating the position information detected by the sensors 8a and 8b so that an enlarged image G will not be stored in the storage unit 12 when the calculated velocity is greater than or equal to a predetermined threshold even if the movement distance, exceeds a predetermined threshold.

Accordingly, images are not acquired when the relative moving velocity is greater than or equal to the predetermined threshold, whereas images are acquired when the relative moving velocity is less than the predetermined threshold. Generally, when moving the objective lens 9 and the stage 6 relative to each other while operating the operation input unit 4, the relative moving velocity is high in regions not of interest, such as regions where the subject of observation is absent. On the other hand, the relative moving velocity is low in regions where the subject of observation is present. Thus, in a region where the subject of observation is present, the relative moving velocity is less than the predetermined threshold, so that an enlarged image G is acquired by the image capturing unit 10 each time a relative movement by the predetermined distance occurs.

That is, when the stage 6 is being moved at a high velocity, the image displayed on the display unit 5 changes rapidly, so that it is possible to determine that the image represents a region that the observer need not observe. Thus, by not storing enlarged images G in such regions, it is possible to avoid the problem of storing ineffective enlarged images G for such regions (e.g., an image not containing the sample A) in the storage unit 12.

Furthermore, in the case where a microscope main unit with which it is possible to observe the same sample A by multiple observation methods is used, such as fluorescence observation, reflected-light observation, and differential interference contrast observation, an observation-method changing unit may be provided so that a virtual slide will be newly created upon switching of the observation method.

Accordingly, when the observation method is changed by the operation of the observation-method changing unit, the image processing unit creates a new virtual slide. There are various observation methods depending on the type of subject that is to be observed, such as fluorescence observation, white-light observation, and differential interference contrast observation. When the observation method is changed, the subject of observation changes. Thus, by newly creating a virtual slide upon switching, it is possible to create a virtual slide for each observation method.

Next, a virtual-slide creating device according to another embodiment of the present invention will be described with reference to the drawings.

Figure 12:
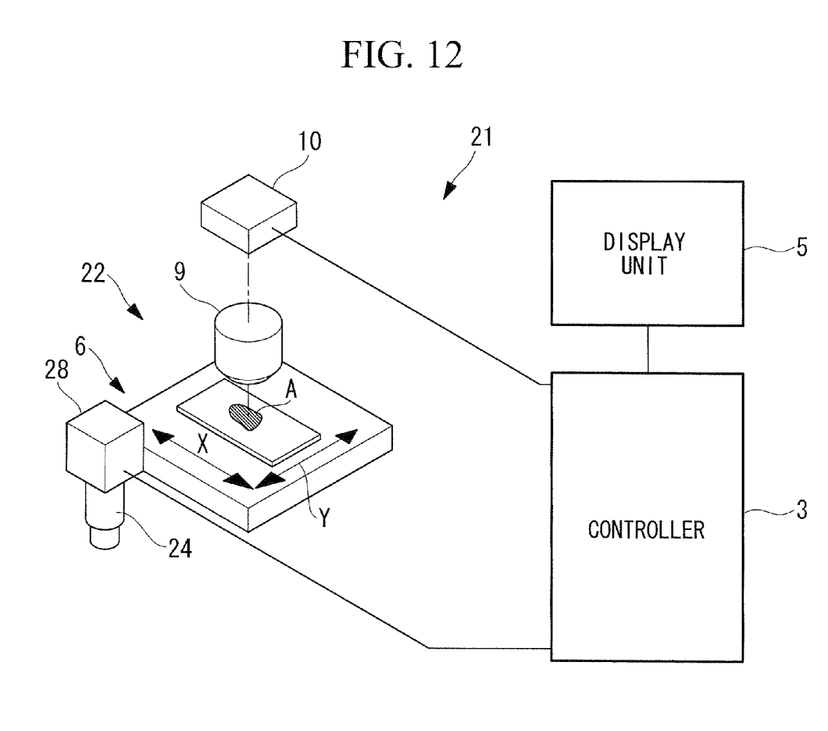
FIG. 12 is an overall configuration diagram schematically showing a virtual-slide creating device according to another embodiment of the present invention.

As shown in FIG. 12, a virtual-slide creating device 21 according to this embodiment includes a microscope main unit 22, a controller 3 that controls the microscope main unit 22 and that creates a virtual slide, and a display 5 that displays an image captured by the microscope main unit 22 and that displays the virtual slide created by the controller 3.

The microscope main unit 22 includes a stage 6 on which a sample A placed on a slide glass is mounted, an operating handle (relative movement mechanism) 24 with which the stage 6 can be directly moved manually in the directions of arrows X and Y perpendicular to the optical axis of an objective lens 9, an encoder (position detecting unit) 28 that detects the coordinate position (relative position information) of the stage 6, an objective lens 9 that faces the sample A and that collects light from the sample A, and an image capturing unit 10 that captures the light collected by the objective lens 9 to acquire an enlarged image of the sample A.

Specifically, the operating handle 24 has a duplex structure formed of an inner cylindrical member and an outer cylindrical member. The stage 6 can be moved in the directions of the arrows X and Y by manually rotating these cylindrical members individually.

Furthermore, the encoder 28 is attached to the operating handle 24. The encoder 28 is configured to detect the coordinate position in the X direction and the coordinate position in the Y direction of the stage 6 and to send the resulting position information to the controller 3. The configuration is otherwise the same as the previous embodiment, so that a description thereof is omitted.

According to this embodiment, it is possible to create a virtual slide while manually moving the stage 6 without using driving means, such as motors. Thus, in addition to the advantages of the previous embodiment, it is possible to provide the virtual-slide creating device 21 that has a simple structure, that is inexpensive, and that makes it possible to create a virtual slide of a subject of observation without setting a movement pattern in advance.

REFERENCE SIGNS LIST

A Sample
1, 21 Virtual-slide creating devices
4 Operation input unit
5 Display unit
6 Stage
7a, 7b Motors (relative movement mechanism)
8a, 8b Sensors (position detecting unit)
9 Objective lens
10 Image capturing unit
11 Determining unit (velocity detecting unit, contrast calculating unit, contrast comparing unit)
12 Storage unit (image saving unit)
13 Image processing unit.

What is claimed is:

1. A virtual-slide creating device comprising:
    a stage on which a sample is mounted;
    an objective lens that collects light from the sample mounted on the stage;
    a relative movement mechanism that moves at least one of the stage and the objective lens relative to each other in a direction crossing the optical axis of the objective lens to produce a relative moving velocity, said relative movement mechanism configured to produce relative moving velocities of at least greater and lesser than a predetermined threshold;
    an operation input unit that outputs a movement instruction signal to the relative movement mechanism;
    a position detecting unit that obtains relative position information of the stage and the objective lens;
    an image capturing unit that captures the light collected by the objective lens to acquire a partial enlarged image of the sample;
    a display unit that displays the enlarged image acquired by the image capturing unit;
    an image saving unit that saves an enlarged image acquired by the image capturing unit each time at least one of the stage and the objective lens is moved relative to each other by a predetermined distance, based on the relative position information obtained by the position detecting unit;
    an image processing unit that creates a virtual slide by forming an array of enlarged images saved by the image saving unit, based on the relative position information detected by the position detecting unit; and
    a velocity detecting unit that detects a relative moving velocity of at least one of the stage and the objective lens,
    wherein the image saving unit saves an enlarged image acquired by the image capturing unit only when the relative moving velocity detected by the velocity detecting unit is less than the predetermined threshold and not save images when the relative moving velocity detected by the velocity detecting unit is the predetermined threshold or greater.

2. The virtual-slide creating device according to claim 1, further comprising:
    a storage unit that stores the enlarged image acquired by the image capturing unit in association with the relative position information of the stage and the objective lens detected by the position detecting unit at the time of acquisition of the enlarged image;
    a contrast calculating unit that calculates a contrast value of the enlarged image acquired by the image capturing unit; and
    a contrast comparing unit that compares the contrast value calculated by the contrast calculating unit with a contrast value of another enlarged image acquired at the same position and stored in the storage unit,
    wherein the image processing unit uses the newly acquired enlarged image to create the virtual slide when the newly acquired enlarged image has a higher contrast value than the other enlarged image stored in the storage unit as a result of comparison by the contrast comparing unit.

3. The virtual-slide creating device according to claim 1, further comprising an observation-method changing unit that changes an observation method,
 wherein the image processing unit creates a new virtual slide in accordance with a change of the observation method by the observation-method changing unit.

4. The virtual-slide creating device according to claim 1, further comprising:
 a storage unit that stores the enlarged image acquired by the image capturing unit in association with the relative position information of the stage and the objective lens detected by the position detecting unit at the time of acquisition of the enlarged image; and
 an observation-magnification-factor changing unit that changes an observation magnification factor,
 wherein the image processing unit uses the newly acquired enlarged image to create the virtual slide when the observation magnification factor changed by the observation-magnification-factor changing unit is higher than the observation magnification factor of another enlarged image acquired at the same position and stored in the storage unit.

* * * * *